US012734617B2

(12) United States Patent
Tachibana et al.

(10) Patent No.: US 12,734,617 B2
(45) Date of Patent: Sep. 15, 2026

(54) BRAZING PASTE

(71) Applicants: SENJU METAL INDUSTRY CO., LTD., Tokyo (JP); TOYOTA JIDOSHA KABUSHIKI KAISHA, Aichi-ken (JP)

(72) Inventors: Yoshie Tachibana, Tokyo (JP); Hiroshi Kawanago, Tokyo (JP); Takashi Akagawa, Tokyo (JP); Satoshi Masuda, Tokyo (JP); Masaki Sugiyama, Toyota (JP); Yosuke Kazumoto, Toyota (JP); Hisaya Sugimoto, Nagoya (JP); Hiroaki Hatsuyama, Toyota (JP)

(73) Assignees: SENJU METAL INDUSTRY CO., LTD., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 429 days.

(21) Appl. No.: 18/138,267

(22) Filed: Apr. 24, 2023

(65) Prior Publication Data

US 2023/0364721 A1 Nov. 16, 2023

(30) Foreign Application Priority Data

May 10, 2022 (JP) ................................ 2022-077550

(51) Int. Cl.
*B23K 35/36* (2006.01)
*B23K 35/02* (2006.01)
(Continued)

(52) U.S. Cl.
CPC ........ *B23K 35/3602* (2013.01); *B23K 35/025* (2013.01); *B23K 35/26* (2013.01);
(Continued)

(58) Field of Classification Search
CPC ............................................ B23K 35/36–362
See application file for complete search history.

(56) References Cited

U.S. PATENT DOCUMENTS 4,231,815 A * 11/1980 Snyder ................. B23K 35/025 148/24
4,504,007 A * 3/1985 Anderson, Jr. .... B23K 35/3612 228/123.1

(Continued)

FOREIGN PATENT DOCUMENTS

CN 1064637 9/1992
CN 1836825 A * 9/2006

(Continued)

OTHER PUBLICATIONS

Matsumoto H., et al.; "Low Temperature Brazing Technique for Accelerators", Contributed to the 5th European Particle Accelerator Conference (EPAC96), Jun. 1996. (Year: 1996).*

*Primary Examiner* — Sally A Merkling
*Assistant Examiner* — Austin Pollock
(74) *Attorney, Agent, or Firm* — Wenderoth, Lind & Ponack, L.L.P.

(57) ABSTRACT

A brazing paste contain a brazing material in an amount of 80% by mass or more and 95% by mass or less; and a binder in an amount of 5% by mass or more and 20% by mass or less. The brazing material contains a flux in an amount of 2% by mass or more and 5% by mass or less. The binder contains a solid solvent containing two or more hydroxyl groups and having 8 to 10 carbon atoms, and a liquid solvent. When the binder does not contain a thixotropic agent, the liquid solvent is contained in an amount of 68% by mass or more with respect to a total of the binder, and when the binder contains a thixotropic agent, the thixotropic
(Continued)

agent is contained in an amount of 11% by mass or less with respect to a total of the binder.

6 Claims, 1 Drawing Sheet

(51) Int. Cl.
*B23K 35/26* (2006.01)
*B23K 35/30* (2006.01)

(52) U.S. Cl.
CPC ............ *B23K 35/262* (2013.01); *B23K 35/30* (2013.01); *B23K 35/3617* (2013.01)

(56) References Cited

U.S. PATENT DOCUMENTS

| | | | | |
|---|---|---|---|---|
| 5,122,201 | A * | 6/1992 | Frazier | B23K 35/3612 148/26 |
| 2004/0000335 | A1* | 1/2004 | Kopel | F24F 6/00 137/123 |
| 2004/0000355 | A1* | 1/2004 | Suga | B23K 35/3612 148/25 |
| 2019/0009375 | A1* | 1/2019 | Hayashi | B23K 1/20 |
| 2020/0187363 | A1* | 6/2020 | Furusawa | B23K 35/3612 |
| 2021/0078113 | A1* | 3/2021 | Kawanago | B23K 35/025 |
| 2021/0187672 | A1* | 6/2021 | Nomura | B23K 35/0244 |

FOREIGN PATENT DOCUMENTS

| | | | | |
|---|---|---|---|---|
| CN | 105965178 | | 9/2016 | |
| CN | 110666392 | | 1/2020 | |
| EP | 0 140 344 | | 5/1985 | |
| EP | 0140344 | A2 * | 5/1985 | B23K 35/22 |
| EP | 4 043 137 | | 8/2022 | |
| JP | 7-8439 | | 2/1995 | |
| JP | 8-294792 | | 11/1996 | |
| JP | 2024-25305 | | 1/2004 | |
| JP | 2016-93830 | | 5/2016 | |
| JP | 2018-43252 | | 3/2018 | |
| JP | 2019-38026 | | 3/2019 | |
| JP | 2021-76224 | | 5/2021 | |
| WO | WO-2022054775 | A1 * | 3/2022 | C09D 5/24 |

* cited by examiner

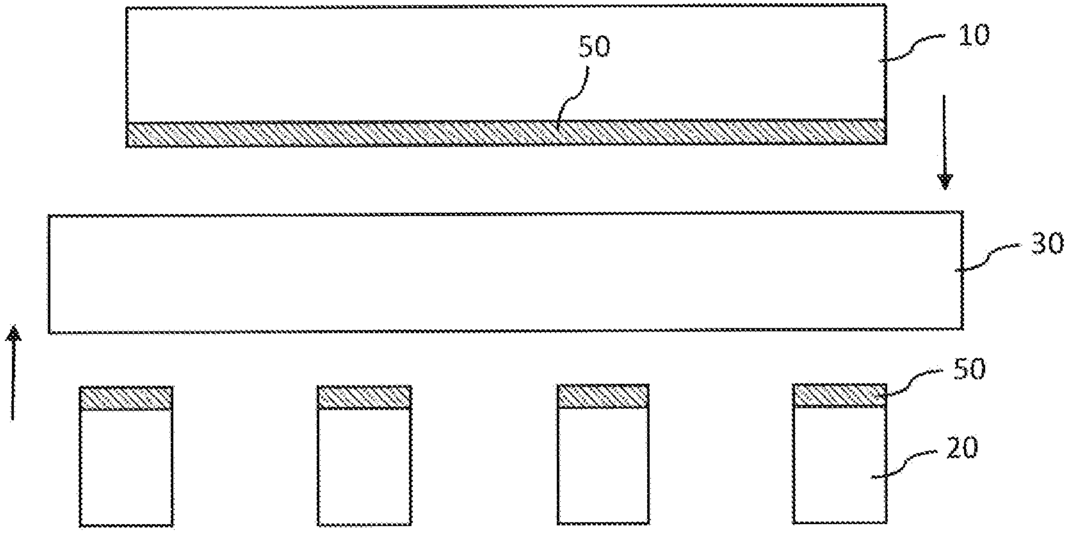
10
50
30
50
20

BRAZING PASTE

TECHNICAL FIELD

The present invention relates to a brazing paste.

The present application claims the priority of Japanese Patent Application No. 2022-077550 filed on May 10, 2022, the contents of which are entirely incorporated by reference.

BACKGROUND ART

Conventionally, brazing materials have been used to join members, particularly metal members. For example, JP 2021-76224 A discloses an aspect in which a pipe member is joined to a joint body by brazing using nickel solder, silver solder, or the like in a state where an end of the pipe member is inserted into an opening of a joint member. JP 2021-76224 A discloses that brazing is performed along a boundary between the opening and an outer peripheral surface of the pipe member on an end surface of the joint body, and a brazing material that has been melted and become liquid enters a slight gap between an inner peripheral surface of the opening and the outer peripheral surface of the pipe member due to a capillary phenomenon, and the brazing material that has entered decreases in temperature and is cured, whereby the end of the pipe member and the joint body are joined by brazing.

SUMMARY OF INVENTION

Problem to be Solved by Invention

In the joining using brazing materials, joining is generally performed using pelletized brazing materials. Since such pelletized brazing materials do not have high workability, use scenes have been limited. Note that it is also necessary to provide a recess to place a pelletized brazing material in a case where the pelletized brazing material is used.

In order to improve such a situation, the present invention provides a paste-like brazing material which can achieve high workability.

Means for Solving Problem

[Concept 1]

A brazing paste may comprise:

a brazing material in an amount of 80% by mass or more and 95% by mass or less; and a binder in an amount of 5% by mass or more and 20% by mass or less, wherein the brazing material may contain a flux in an amount of 2% by mass or more and 5% by mass or less, the binder may contain a solid solvent containing two or more hydroxyl groups and having 8 to 10 carbon atoms, and a liquid solvent, (1) when the binder does not contain a thixotropic agent, the liquid solvent may be contained in an amount of 68% by mass or more with respect to a total of the binder, and (2) when the binder contains a thixotropic agent, the thixotropic agent may be contained in an amount of 11% by mass or less with respect to a total of the binder.

[Concept 2]

In the brazing paste according to concept 1, a TG residue at 250° C. when being measured at a temperature increase rate of 10° C./min from 25° C. to 450° C. may be 0% by mass or more and 1% by mass or less.

[Concept 3]

In the brazing paste according to concept 1 or 2, the binder contains the solid solvent that may not cause an endothermic reaction with respect to the flux.

[Concept 4]

In the brazing paste according to any one of concepts 1 to 3, the brazing material may contain metal, and any one or both of boric acid and borax.

[Concept 5]

The brazing paste according to any one of concepts 1 to 4 may contain 2,5-dimethyl-2,5-hexanediol as the solid solvent of the binder

[Concept 6]

The brazing paste according to any one of concepts 1 to 5 may contain any one or more of isobornyl cyclohexanol, terpineol, and isooctadecanol as the liquid solvent of the binder.

According to the present invention, provided is the paste-like brazing material which can achieve sufficient joining and has the high workability.

BRIEF DESCRIPTION OF DRAWINGS

FIG. 1 is a side view illustrating an aspect in which metal parts are joined together using a brazing paste according to the present embodiment.

DETAILED DESCRIPTION

Hereinafter, a preferred embodiment of the present embodiment will be described in detail. In the present embodiment, "or" is a concept including "and", and A or B represents either A or B, or both A and B.

A paste-like brazing paste of the present embodiment may contain a brazing material and a binder. The brazing material may contain metal and boric acid or borax as a flux. The binder may contain a solid solvent and a liquid solvent, and may further contain a thixotropic agent. In the present embodiment, a material containing boric acid and borax may be Tobox.

In the present embodiment, the brazing paste can be provided. The use of such a brazing paste enables direct application to a joining part to ensure wetting, and acquisition of stable joining quality. In addition, parts to be molded can be miniaturized and simplified, and processing accuracy and yield per part can be improved. Furthermore, due to adhesiveness of the brazing paste, it is easier to stack and join smaller parts like bricks, and various applications become possible even in a mass production stage. As an example, a brazing paste 50 of the present embodiment is used when metal parts 10 and 20 as illustrated in FIG. 1 are joined to another metal part 30. For example, the brazing paste is spread on the surfaces of the metal parts 10 and 20 and used when the metal parts 10 and 20 are joined to the other metal part 30. Such joining is performed at a temperature of 450° C. or higher, and typically, the metal parts are bonded at 900 to 1000° C. As an example, the brazing paste 50 may be used for joining of constituent parts of an automatic transmission.

The brazing paste may contain 80% by mass or more and 95% by mass or less of the brazing material and 5% by mass or more and 20% by mass or less of the binder. The binder evaporates and disappears at the time of joining, and thus, a ratio between the brazing material and the binder is not particularly limited as will be described later. Since the viscosity decreases and workability decreases when a content of the binder is high, an upper limit of the binder is preferably 20% by mass, more preferably 15% by mass, and still more preferably 10% by mass. In addition, the viscosity increases and the workability also decreases when the content of the binder is low, and thus, a lower limit of the binder is preferably 5% by mass, more preferably 7% by mass, and still more preferably 8% by mass.

As the solid solvent of the binder, one containing two or more hydroxyl groups, having 8 to 10 carbon atoms and being solid at 25° C. is preferably used, and for example, 2,5-dimethyl-2,5-hexanediol or the like may be used.

As the liquid solvent of the binder, a liquid solvent having a low boiling point may be used, and as an example, isobornyl cyclohexanol, terpineol, or isooctadecanol may be used. As the terpineol, α-terpineol, β-terpineol, γ-terpineol, 5-terpineol, or the like may be used. The liquid solvent in the present embodiment means a solvent in a liquid state at 25° C., and the solid solvent means a solvent in a solid state at 25° C. Note that α-terpineol has a boiling point of 217° C. and is not water-soluble.

The metal of the brazing material may be introduced as a metal powder and mixed with the other members to form a paste. Since the brazing paste is in the paste form as described above, the metal powder is not recognizable as a powder with the naked eye. The metal may be an alloy powder, a metal powder, or a mixture of the alloy powder and the metal powder. The metal contained in the brazing material is not particularly limited, and any kind of metal can be used. Note that the metal contained in the brazing material may be appropriately changed according to a material of the metal part to be joined. As an example, a Cu-based alloy powder and an Fe-based metal powder may be used, and more specifically, a CuNiMnSiB alloy powder and an Fe powder may be used. The CuNiMnSiB alloy powder may contain 38.0 to 41.0% by mass of Cu, 40.0 to 43.0% by mass of Ni, 14.0 to 16.0% by mass of Mn, 1.6 to 2.0% by mass of Si, 1.3 to 1.7% by mass of B, and 1.0% by mass or less of the other components. Typically, the alloy powder is a main component of joining, and the metal powder is added to ensure wettability. When an Fe sheet metal is used, the Fe powder can ensure wettability to the Fe sheet metal.

Typically, the alloy powder, the metal powder, boric acid, and borax are contained as the brazing material component. With respect to a total amount (100% by mass) of the brazing material component, 70 to 90% by mass of the alloy powder, 10 to 20% by mass of the metal powder, and 1 to 10% by mass of a flux may be contained. A ratio of boric acid to borax in the flux may be 1:5 to 5:1. Boric acid and borax correspond to the flux functioning as a reducing agent for the alloy powder and the metal powder. Boric acid functions as the reducing agent when Cu, for example, is used as metal in an alloy or a metal simple substance, and borax functions as the reducing agent when Fe is used as metal in an alloy or a metal simple substance. Note that the flux containing boric acid and borax exhibits a reduction effect in a range from about 170° C. to a high temperature (wide temperature range).

As the binder of the present embodiment, one having a characteristic of not inhibiting the reduction by boric acid and borax may be selected. When such a binder is employed, the present embodiment exhibits an extremely beneficial effect on the brazing material containing boric acid or borax. Boric acid or borax is preferably used as the reducing agent for the metal powder contained in the brazing material, and the paste-like brazing paste can be provided while utilizing such boric acid or borax by employing the binder of the present embodiment. Therefore, the present embodiment can exhibit a very excellent effect in terms of allowing extremely various applications. Note that, as confirmed by the inventors of the present application, the binder remains when the metal parts are bonded to each other at a high temperature of about 900 to 1000° C. unless appropriate solid solvent and liquid solvent are used. If the binder remains as described above, the reduction effect by boric acid or borax contained in the brazing material is inhibited, and the function of the brazing material as a joining material is not exhibited. Note that it is assumed that the binder material finally evaporates and disappears, and thus, the metal contained in the brazing material is not particularly limited as described above.

The binder may contain a thixotropic agent. As the thixotropic agent, an amide component may be used, and as an example, stearic acid amide, toluamide, lauric acid amide, myristic acid amide, palmitic acid amide, or the like may be used.

As an example, 2,5-dimethyl-2,5-hexanediol as a solid solvent, terpineol, isobornyl cyclohexanol or isooctadecanol as a liquid solvent, and stearic acid amide or toluamide as a thixotropic agent may be included as the binder component.

As an example, the brazing paste may contain 80% by mass or more and 95% by mass or less of a brazing material and 5% by mass or more and 20% by mass or less of a binder, the brazing material may contain 2% by mass or more and 5% by mass or less of a flux, and the binder may contain two or more hydroxyl groups, a solid solvent having 8 to 10 carbon atoms and being solid at 25° C., and a liquid solvent. Further, when the binder does not contain a thixotropic agent, the liquid solvent may be contained in an amount of 68% by mass or more with respect to the entire binder. Unlike such an aspect, when the binder contains a thixotropic agent, the thixotropic agent may be contained in an amount of 11% by mass or less with respect to the entire binder. Note that the brazing paste may contain components other than these.

A solid solvent that does not cause an endothermic reaction with respect to a flux may be selected. As an example, 2,5-dimethyl-2,5-hexanediol does not cause the endothermic reaction with respect to a flux containing boric acid or borax, and thus, 2,5-dimethyl-2,5-hexanediol may be selected as the solid solvent when the flux containing boric acid or borax is employed. Note that the endothermic reaction in the present embodiment means a reaction of absorbing heat from the outside in chemical reactions.

As the binder component, the solid solvent may be contained in an amount of 10 to 60% by mass, and the liquid solvent may be contained in an amount of 10 to 90% by mass. As an example, a solid solvent containing 2,5-dimethyl-2,5-hexanediol may be contained in an amount of 10 to 60% by mass, and (1) when the binder does not contain a thixotropic agent, a liquid solvent containing any one or more of terpineol, isooctadecanol, and isobornyl cyclohexanol may be contained in an amount of 68% by mass or more with respect to the entire binder, and (2) when the binder contains a thixotropic agent, a liquid solvent containing one or more of terpineol, isooctadecanol, and isobornyl cyclohexanol may be contained in an amount of 10 to 90% by mass with respect to the entire binder, and the thixotropic agent may be contained in an amount of 11% by mass or less with respect to the entire binder.

Note that terpineol is contained, as an upper limit value, in an amount of preferably 64% by mass or less and more preferably 60% by mass or less with respect to the entire binder when terpineol is used as the single liquid solvent, 2,5-dimethyl-2,5-hexanediol is used as the solid solvent, and the binder does not contain a thixotropic agent. In this case, as a lower limit value, terpineol is contained in an amount of preferably 35% by mass or more, more preferably 40% by mass or more, and still more preferably 50% by mass or more with respect to the entire binder. This is because paste separation occurs so that paste storage performance deteriorates when a content of terpineol increases under such conditions. On the other hand, binder properties deteriorate when the content of terpineol decreases.

When 2,5-dimethyl-2,5-hexanediol is used as the solid solvent, a lower limit value of 2,5-dimethyl-2,5-hexanediol in the binder component (in 100% by mass) is preferably 25% by mass and more preferably 30% by mass in order to achieve optimum softness and optimum tackiness (tackiness of 0.6 or more) as the paste. In addition, in the binder component, an upper limit value of 2,5-dimethyl-2,5-hexanediol is preferably 65% by mass, more preferably 50% by mass, and still more preferably 40% by mass.

When 2,5-dimethyl-2,5-hexanediol is used as the solid solvent, and any one or more of terpineol, isooctadecanol, and isobornyl cyclohexanol is used as the liquid solvent, a lower limit value of a total value (including a case of being zero without containing any of terpineol, isooctadecanol, and isobornyl cyclohexanol) of terpineol, isooctadecanol, and isobornyl cyclohexanol in the binder component (in 100% by mass) is preferably 45% by mass, and more preferably 50% by mass in order to achieve the optimum softness and the optimum tackiness (tackiness of 0.6 or more) as the paste. In addition, an upper limit value of the total value of terpineol, isooctadecanol, and isobornyl cyclohexanol in the binder component is preferably 75% by mass, and more preferably 70% by mass.

From the viewpoint of more reliably suppressing the residue of the binder at the time of joining the metal parts to each other, the binder is contained in an amount of preferably 10% by mass or less, more preferably 6% by mass or less, and still more preferably 2% by mass or less with respect to the entire binder component.

EXAMPLES

A CuNiMnSiB alloy powder was used as an alloy powder, and the powder having a particle size distribution of 22 μm to 44 μm and a D50 of 33 μm was used. Note that the CuNiMnSiB alloy powder contained 38.0 to 41.0% by mass of Cu, 40.0 to 43.0% by mass of Ni, 14.0 to 16.0% by mass of Mn, 1.6 to 2.0% by mass of Si, 1.3 to 1.7% by mass of B, and 1.0% by mass or less of the other components.

An Fe powder was used as a metal powder, and the powder having a particle size distribution of 75 μm or less and a D50 of 33 μm was used.

A flux containing boric acid and borax at a ratio of 4:1 was used.

82% by mass of the CuNiMnSiB alloy powder, 15% by mass of the Fe powder, and 3% by mass of the flux were contained in 100% by mass of a brazing material.

A TG residue % at 175° C. was measured using Thermogravimetry-Differential Thermal Analysis TG-DTA manufactured by Hitachi High-Tech Corporation under condition that a temperature increase rate is 10° C./min from 25° C. to 450° C. The TG residue % affects joining strength. In the table, % represents a value at the TG residue at 175° C. It was evaluated as "o" when the TG residue at 175° C. was less than 1% by mass, and as "x" when the TG residue at 175° C. was 1% by mass or more.

Flux reactivity was determined by visual observation after trial production of the paste. It was evaluated as "o" when there was no reaction caused by boric acid and borax by visual observation, and as "x" when there was a reaction caused by boric acid and borax by visual observation.

Paste formation was confirmed by viscosity according to JIS and visual observation. It was evaluated as "o" when the viscosity was 50 to 160 Pa·s and the separation could not be confirmed by visual observation, and as "x" when the viscosity was outside the range of 50 to 160 Pa·s or the separation could be confirmed by visual observation.

Strength was measured using DFH210 (static torsion tester) manufactured by Saginomiya Seisakusho, Inc. When the strength is weak, the function as the bonding material is not fulfilled. It was evaluated as "o" when the strength was 7900 Nm or more, and as "x" when the strength was less than 7900 Nm. Note that it is presumed that the reduction effect by the flux is inhibited when the TG residue at 175° C. increases, and as a result, the strength decreases. Note that a value at 175° C. is used in the present embodiment, but the determination may be made with a value higher than 175° C., and one with a residue at 220° C. being less than 1% by mass may be selected, or one having a residue at 250° C. being less than 1% by mass may be selected. However, in terms of the effect, it is preferable that the TG residue % at 250° C. be less than 1% by mass, it is more preferable that the TG residue % at 220° C. be less than 1% by mass, and it is still more preferable that the TG residue % at 175° C. be less than 1% by mass.

Binder components respectively formed using Examples 1 to 9 in Table 1 were prepared.

Next, 91% by mass of the brazing material component was mixed with 9% by mass of the binder component, and then, the TG residue at 175° C., the flux reactivity, the paste formation, and the strength were measured. Note that the brazing material component (100% by mass) is formed by mixing 82% by mass of the CuNiMnSiB alloy powder, 15% by mass of the Fe powder, and 3% by mass of the flux as described above, and the same applies to Comparative Examples 1 to 14 to be described later.

TABLE 1

| | | Example 1 | Example 2 | Example 3 | Example 4 | Example 5 |
|---|---|---|---|---|---|---|
| Solid solvent | 2,5-dimethyl-2,5-hexanediol | 35 | 35 | 35 | 30 | 30 |
| Liquid solvent | Isobornyl cyclohexanol | | | 5 | | |
| Liquid solvent | α-terpineol (terpineol) | 55 | 63 | 54 | 32.5 | 34 |
| Liquid solvent | Isooctadecanol | | | | 32.5 | 34 |
| Thixotropic agent | Stearic acid amide | 4 | 0.8 | 2.4 | 2 | 0.8 |
| Thixotropic agent | P-toluamide | 6 | 1.2 | 3.6 | 3 | 1.2 |
| | Total | 100 | 100 | 100 | 100 | 100 |
| | TG | ○ | ○ | ○ | ○ | ○ |
| | Flux reactivity | ○ | ○ | ○ | ○ | ○ |

TABLE 1-continued

| | | | | | | |
|---|---|---|---|---|---|---|
| | Paste formation | ○ | ○ | ○ | ○ | ○ |
| | Strength | ○ | ○ | ○ | ○ | ○ |

| | | Example 6 | Example 7 | Example 8 | Example 9 |
|---|---|---|---|---|---|
| Solid solvent | 2,5-dimethyl-2,5-hexanediol | 30 | 30 | 30 | 30 |
| Liquid solvent | Isobornyl cyclohexanol | | | | |
| Liquid solvent | α-terpineol (terpineol) | 35 | 21.7 | 34 | 34 |
| Liquid solvent | Isooctadecanol | 35 | 43.3 | 34 | 34 |
| Thixotropic agent | Stearic acid amide | | 2 | 2 | |
| Thixotropic agent | P-toluamide | | 3 | | 2 |
| | Total | 100 | 100 | 100 | 100 |
| | TG | ○ | ○ | ○ | ○ |
| | Flux reactivity | ○ | ○ | ○ | ○ |
| | Paste formation | ○ | ○ | ○ | ○ |
| | Strength | ○ | ○ | ○ | ○ |

As illustrated in Table 1, excellent results were obtained in terms of each of the TG, the flux reactivity, the paste formation, and the strength in all of Example 1 to 9. Note that, in a case where it is evaluated as "o" for the TG residue % at 175° C., naturally, the TG residue % at 250° C. is also 1% by mass or less.

Binder components respectively formed using Comparative Example 1 to 7 in Table 2 were prepared.

The TG, the flux reactivity, the paste formation, and the strength were evaluated in the same manner as in Examples. In Comparative Example 1 in which a solid solvent was not used, preferable results could not be obtained in terms of the TG and the strength. In Comparative Examples 2 to 7 in which a solid solvent containing two or more hydroxyl groups and having 8 to 10 carbon atoms was not used, preferable results could not be obtained in terms of the flux reactivity, the paste formation, and the strength.

TABLE 2

| | | Comparative Example 1 | Comparative Example 2 | Comparative Example 3 | Comparative Example 4 |
|---|---|---|---|---|---|
| Solid solvent | Trimethylolpropane | | 45 | | |
| Solid solvent | Neopentyl glycol | | 45 | 70 | 70 |
| Solid solvent | 2,5-dimethyl-2,5-hexanediol | | | | |
| Liquid solvent | Isobornyl cyclohexanol | 40 | | | |
| Liquid solvent | 2-ethyl-1,3-hexanediol | 40 | | | |
| Liquid solvent | Butyl carbitol | | 10 | 30 | |
| Liquid solvent | BFTG (tripropylene glycol monobutyl ether) | | | | 30 |
| Liquid solvent | Phenyl glycol | | | | |
| Liquid solvent | Hexylene glycol | | | | |
| Liquid solvent | Tetraethylene glycol dimethyl ether | | | | |
| Liquid solvent | α-terpineol (terpineol) | | | | |
| Liquid solvent | Isooctadecanol | | | | |
| Thixotropic agent | Stearic acid amide | 8 | | | |
| Thixotropic agent | P-toluamide | 12 | | | |
| | Total | 100 | 100 | 100 | 100 |
| | TG | x | ○ | ○ | ○ |
| | Flax reactivity | ○ | x | x | x |
| | Paste formation | ○ | x | x | x |
| | Strength | x | x | x | x |

| | | Comparative Example 5 | Comparative Example 6 | Comparative Example 7 |
|---|---|---|---|---|
| Solid solvent | Trimethylolpropane | | | |
| Solid solvent | Neopentyl glycol | 70 | 70 | 70 |
| Solid solvent | 2,5-dimethyl-2,5-hexanediol | | | |
| Liquid solvent | Isobornyl cyclohexanol | | | |
| Liquid solvent | 2-ethyl-1,3-hexanediol | | | |
| Liquid solvent | Butyl carbitol | | | |
| Liquid solvent | BFTG (tripropylene glycol monobutyl ether) | | | |
| Liquid solvent | Phenyl glycol | 30 | | |
| Liquid solvent | Hexylene glycol | | 30 | |
| Liquid solvent | Tetraethylene glycol dimethyl ether | | | 30 |

TABLE 2-continued

| | | | | |
|---|---|---|---|---|
| Liquid solvent | α-terpineol (terpineol) | | | |
| Liquid solvent | Isooctadecanol | | | |
| Thixotropic agent | Stearic acid amide | | | |
| Thixotropic agent | P-toluamide | | | |
| | Total | 100 | 100 | 100 |
| | TG | ○ | ○ | ○ |
| | Flax reactivity | x | x | x |
| | Paste formation | x | x | x |
| | Strength | x | x | x |

Binder components respectively formed using Comparative Example 8 to 14 in Table 3 were prepared.

The TG, the flux reactivity, the paste formation, and the strength were evaluated in the same manner as in Examples. In Comparative Examples 8 and 9 in which a solid solvent containing two or more hydroxyl groups and having 8 to 10 carbon atoms was not used, preferable results could not be obtained in terms of the flux reactivity, the paste formation, and the strength as in Comparative Example 2 to 7.

In Comparative Examples 10 to 12 in which a liquid solvent was contained in an amount of 65% by mass or less with respect to the entire binder in the case of using 2, 5-dimethyl-2, 5-hexanediol as a solid solvent and not containing the thixotropic agent, preferable results could not be obtained in terms of the strength. In addition, in Comparative Examples 10 and 11 in which α-terpineol was used as a liquid solvent, preferable results could not be obtained in terms of the paste formation either. In addition, in Comparative Example 12 in which isooctadecanol was used as a liquid solvent, preferable results could not be obtained in terms of the TG either.

In Comparative Examples 13 and 14 in which 2, 5-dimethyl-2, 5-hexanediol was used as a solid solvent and a content of the thixotropic agent was 15% by mass or more, preferable results could not be obtained in terms of each of the TG and the strength.

TABLE 3

| | | Comparative Example 8 | Comparative Example 9 | Comparative Example 10 | Comparative Example 11 |
|---|---|---|---|---|---|
| Solid solvent | Trimethylolpropane | | 70 | | |
| Solid solvent | Neopentyl glycol | 70 | | | |
| Solid solvent | 2,5-dimethyl-2,5-hexanediol | | | 70 | 35 |
| Liquid solvent | α-terpineol (terpineol) | 30 | 30 | 30 | 65 |
| Liquid solvent | Isooctadecanol | | | | |
| Thixotropic agent | Stearic acid amide | | | | |
| Thixotropic agent | P-toluamide | | | | |
| | Total | 100 | 100 | 100 | 100 |
| | TG | ○ | ○ | ○ | ○ |
| | Flux reactivity | x | x | ○ | ○ |
| | Paste formation | x | x | x | x |
| | Strength | x | x | x | x |

| | | Comparative Example 12 | Comparative Example 13 | Comparative Example 14 |
|---|---|---|---|---|
| Solid solvent | Trimethylolpropane | | | |
| Solid solvent | Neopentyl glycol | | | |
| Solid solvent | 2,5-dimethyl-2,5-hexanediol | 35 | 35 | 35 |
| Liquid solvent | α-terpineol (terpineol) | | 45 | 50 |
| Liquid solvent | Isooctadecanol | 65 | | |
| Thixotropic agent | Stearic acid amide | | 8 | 6 |
| Thixotropic agent | P-toluamide | | 12 | 9 |
| | Total | 100 | 100 | 100 |
| | TG | x | x | x |
| | Flux reactivity | ○ | ○ | ○ |
| | Paste formation | ○ | ○ | ○ |
| | Strength | x | x | x |

In addition, when precipitation performance for 30% by mass of 2,5-dimethyl-2,5-hexanediol was confirmed, it was confirmed that the precipitation performance of 2,5-dimethyl-2,5-hexanediol was extremely excellent in the case of α-terpineol, and it was also confirmed that it is beneficial to employ α-terpineol in the case of using 2,5-dimethyl-2,5-hexanediol.

REFERENCE SIGNS LIST

10, 20, 30 metal part
50 brazing paste

The invention claimed is:

1. A brazing paste comprising:

a brazing material having a melting point of 450° C. or higher, in an amount of 80% by mass or more and 95% by mass or less; and a binder in an amount of 5% by mass or more and 20% by mass or less, wherein the brazing material contains a flux in an amount of 2% by mass or more and 5% by mass or less, the binder contains a solid solvent containing two or more hydroxyl groups and having 8 to 10 carbon atoms, and a liquid solvent, (1) when the binder does not contain a thixotropic agent, the liquid solvent is contained in an amount of 68% by mass or more with respect to a total of the binder, and (2) when the binder contains a thixotropic agent, the thixotropic agent is contained in an amount of 11% by mass or less with respect to a total of the binder.

2. The brazing paste according to claim 1, wherein a TG residue at 250° C. when being measured at a temperature increase rate of 10° C./min from 25° C. to 450° C. is 0% by mass or more and 1% by mass or less.

3. The brazing paste according to claim 1, wherein the solid solvent contained in the binder does not cause an endothermic reaction with respect to the flux.

4. The brazing paste according to claim 1, wherein the brazing material contains metal, and any one or both of boric acid and borax.

5. The brazing paste according to claim 1 containing 2,5-dimethyl-2,5-hexanediol as the solid solvent of the binder.

6. The brazing paste according to claim 1 containing any one or more of isobornyl cyclohexanol, terpineol, and isooctadecanol as the liquid solvent of the binder.

* * * * *